(12) United States Patent
Omori et al.

(10) Patent No.: US 11,789,581 B2
(45) Date of Patent: Oct. 17, 2023

(54) INPUT DISPLAY SYSTEM, AUXILIARY INFORMATION DISPLAY METHOD AND PROGRAM

(71) Applicant: NIPPON TELEGRAPH AND TELEPHONE CORPORATION, Tokyo (JP)

(72) Inventors: Kumiko Omori, Tokyo (JP); Takashi Fujinami, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/778,358

(22) PCT Filed: Nov. 27, 2019

(86) PCT No.: PCT/JP2019/046408
§ 371 (c)(1),
(2) Date: May 19, 2022

(87) PCT Pub. No.: WO2021/106110
PCT Pub. Date: Jun. 3, 2021

(65) Prior Publication Data
US 2022/0397987 A1    Dec. 15, 2022

(51) Int. Cl.
*G06F 3/048*    (2013.01)
*G06F 3/0481*    (2022.01)

(52) U.S. Cl.
CPC .................... *G06F 3/0481* (2013.01)

(58) Field of Classification Search
CPC ...... G06F 3/0481; G06F 40/169; G06F 9/453; G06F 40/174; G06F 3/04895; G06F 3/01;
(Continued)

(56) References Cited

U.S. PATENT DOCUMENTS 5,544,299 A * 8/1996 Wenstrand ............ G06F 3/0489
715/802
2003/0210260 A1 * 11/2003 Palmer .................. G06F 3/0481
715/715
(Continued)

FOREIGN PATENT DOCUMENTS

JP    2017146958 A    8/2017
JP    2019003290 A    1/2019

*Primary Examiner* — Pegeman Karimi

(57) ABSTRACT

An input display system displays auxiliary information on a screen when a plurality of predetermined fields are displayed on the screen, and information according to a predetermined rule is input into the field by an operator, the auxiliary information being for supporting an input action of the operator. The input display system includes a memory and a processor configured to calculate an action analysis index value of each of a plurality of action analysis indices having set priorities, based on action information indicating an action performed on an input device used to input information on the screen by the operator, determine whether or not the corresponding auxiliary information is a display candidate, by comparing the action analysis index value to a predetermined threshold value for each of the plurality of action analysis indices, and display on the screen only the auxiliary information corresponding to one action analysis index having a highest priority among one or more action analysis indices related to the display candidate.

8 Claims, 10 Drawing Sheets

(58) Field of Classification Search
CPC .......... G06F 3/048; G06F 3/00; G06F 3/0482; G06F 40/166; G06F 40/10; G06F 9/44; G06F 9/06; G06F 9/00
See application file for complete search history.

(56) References Cited

U.S. PATENT DOCUMENTS

| | | | |
|---|---|---|---|
| 2011/0093782 A1* | 4/2011 | Palmer | G06F 3/04895 715/710 |
| 2013/0111322 A1* | 5/2013 | Marum | G06F 40/174 715/223 |
| 2020/0394259 A1* | 12/2020 | Onuma | G06F 3/04812 |

* cited by examiner

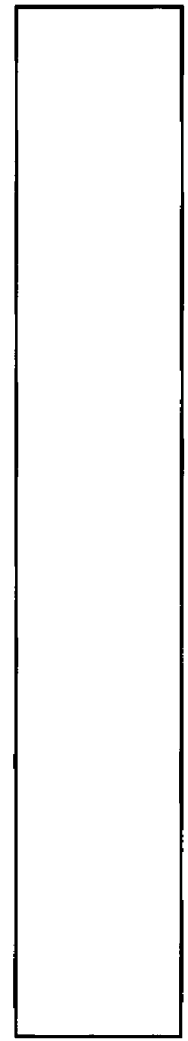
Fig. 4

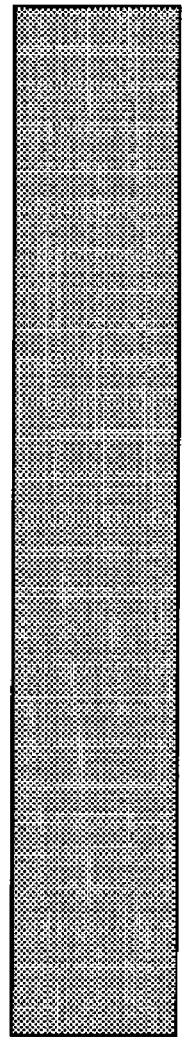
Fig. 5

INPUT DISPLAY SYSTEM, AUXILIARY INFORMATION DISPLAY METHOD AND PROGRAM

CROSS-REFERENCE TO RELATED APPLICATIONS

This application is a U.S. National Stage Application filed under 35 U.S.C. § 371 claiming priority to International Patent Application No. PCT/JP2019/046408, filed on 27 Nov. 2019, the disclosure of which is hereby incorporated herein by reference in its entirety.

TECHNICAL FIELD

The present invention relates to a user interface used when an operator inputs information on a screen.

BACKGROUND ART

A task that an operator inputs information into each field on a screen in which a plurality of fields are displayed is widely performed. It is assumed that the field is a concept including, for example, a region in which an operator is to input a text and a check box selected by an operator. Specific examples include a selection field and a button, such as a radio button, a pull-down, a check box, and a link to another page.

In a case where a user interface is not user-friendly when information is input into the field, it may take time to determine a field into which the operator inputs information the next, the content to be input into the current field, and the like, and the amount of processing of the operator per unit time may be reduced.

CITATION LIST

Patent Literature

PTL 1: JP 2017-146958 A

SUMMARY OF THE INVENTION

Technical Problem

It is desirable to display a user-friendly user interface for inputting information into a field.

In particular, in order to increase the amount of processing per unit time of the operator (processing efficiency of the operator), a technique of displaying appropriate auxiliary information corresponding to in accordance with the proficiency level of the operator is desired.

The present invention has been made in view of the above circumferences, and an object of the present invention is to provide a technique capable of displaying auxiliary information in accordance with corresponding to a proficiency level of an operator on a screen for inputting information into a field in order to improve processing efficiency of the operator.

Means for Solving the Problem

According to a technique of the disclosure, there is provided an input display system that displays auxiliary information on a screen when a plurality of predetermined fields are displayed on the screen, and information according to a predetermined rule is input into each of the fields by an operator, the auxiliary information being for supporting an input action of the operator. The input display system includes a memory and a processor configured to calculate an action analysis index value of each of a plurality of action analysis indices having set priorities, based on action information indicating an action performed on an input device used to input information on the screen by the operator, determine whether or not the corresponding auxiliary information is a display candidate, by comparing the action analysis index value to a predetermined threshold value for each of the plurality of action analysis indices, and display on the screen only the auxiliary information corresponding to one action analysis index having a highest priority among one or more action analysis indices related to the display candidate.

Effects of the Invention

According to the technique of the disclosure, there is provided a technique capable of displaying auxiliary information in accordance with corresponding to a proficiency level of an operator on a screen for inputting information into a field in order to improve processing efficiency of the operator.

BRIEF DESCRIPTION OF DRAWINGS

FIG. 4 is a diagram illustrating an example of a display screen of auxiliary information.
FIG. 5 is a diagram illustrating the example of the display screen of the auxiliary information.

DESCRIPTION OF EMBODIMENTS

Hereinafter, an embodiment of the present invention (the present embodiment) will be described with reference to the drawings. The embodiment to be described below is merely exemplary, and an embodiment to which the present invention is applied is not limited to the following embodiment.

Overall Configuration of System

Figure 1:
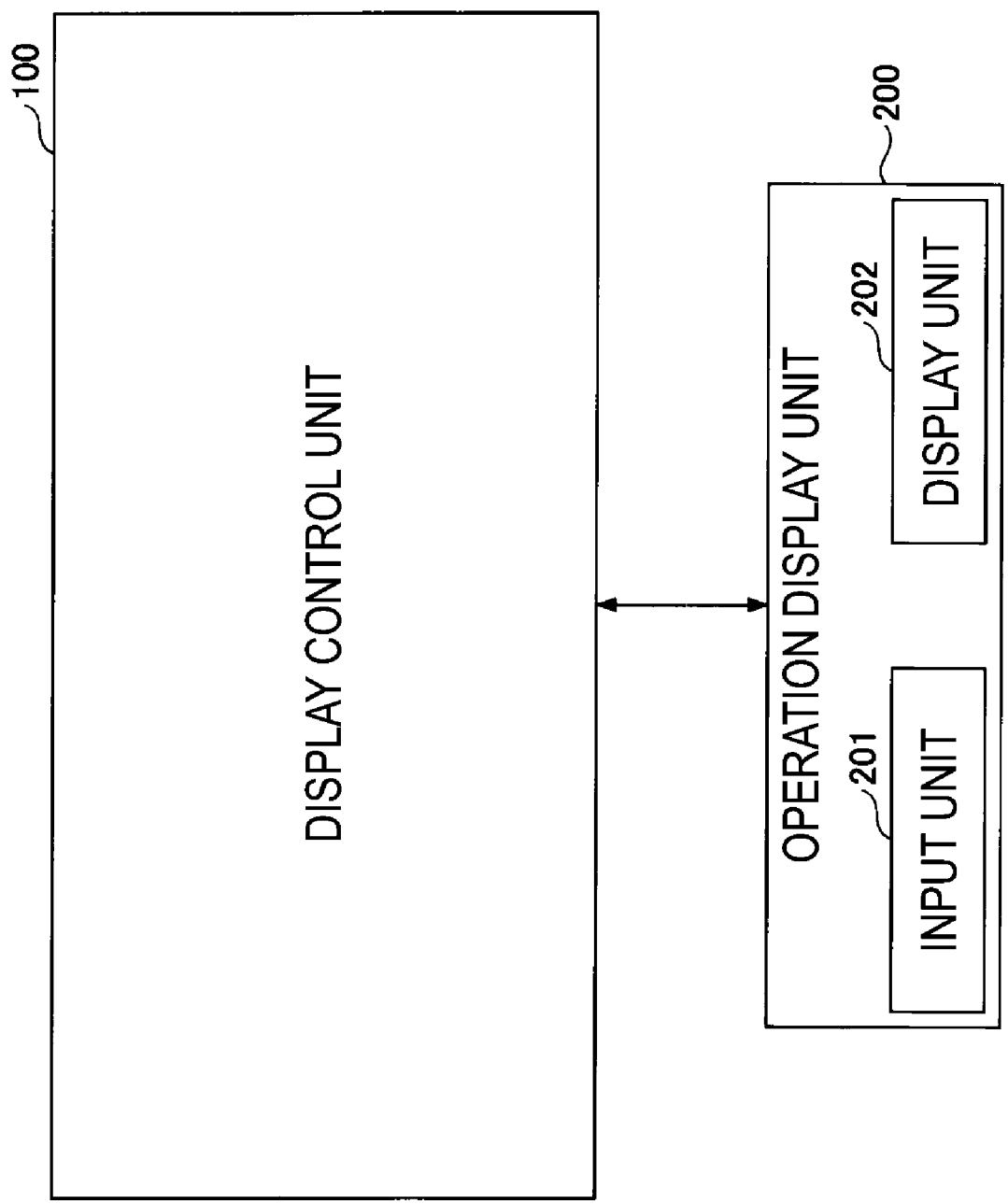
FIG. 1 is a diagram illustrating an overall configuration of an input display system according to an embodiment.

FIG. 1 illustrates an example of an overall configuration of an input display system according to an embodiment of the present invention. As illustrated in FIG. 1, an input display system in the embodiment of the present invention includes a display control unit 100 and an operation display unit 200. The overall configuration is common to Examples 1 and 2 described below.

The operation display unit 200 includes an input unit 201 and a display unit 202. The input unit 201 is, for example, a keyboard and a mouse. The display unit 202 is, for example, a display device.

For example, the operation display unit 200 is a client apparatus such as a PC, a smart phone, and a tablet. The display control unit 100 is a server apparatus connected to the operation display unit 200 via a network (for example, the Internet and a private network). Such a form will be referred to as a client-server type. In this case, a plurality of operation display units 200 may be connected to the display control unit 100.

The input display system may also be one PC (personal computer). Such a form is referred to as a client type. In this case, the operation display unit 200 is a functional unit including a display device, a keyboard, a mouse, and the like. The display control unit 100 is a main body of a PC or the like.

In the client type, the input display system may be a smart phone, tablet, or the like. In this case, the operation display unit 200 is a touch panel in which a display and an input function are integrated. The display control unit 100 is a main body including a CPU, a memory, and the like.

In the present embodiment, an operator (which may be referred to as a user) operates the input unit 201 of the operation display unit 200 to input information into one or more fields (which may be referred to as items) on a screen displayed on the display unit 202 of the operation display unit 200. Any or both of navigation and the annotation, which will be described in detail in Examples 1 and 2 described below, are displayed on the display unit 202. The operator inputs information into the field, with support from the navigation or the annotation. The navigation and the annotation are collectively referred to as auxiliary information.

In the present embodiment, the information input into the field is, for example, information required in a certain work, and is information according to a predetermined rule.

It is assumed that the "operation" in the present embodiment includes not only a character input into the field, information selection by clicking, and the like, but also an action of just moving the mouse. The "operation" may be referred to as the "action". In other words, the "operation" in the present embodiment may be any type of actions performed by the user on the system. In Example 2 described below, an operation that can be effectively used to display the auxiliary information among such operations is particularly used.

That is, the input display system can be implemented by executing a program corresponding to processing performed by the input display system using hardware resources such as a CPU and a memory mounted in a computer. The program can be recorded on a computer-readable recording medium (a portable memory or the like) to be stored or distributed. The program can also be provided via a network such as the Internet or an electronic mail.

Figure 2:
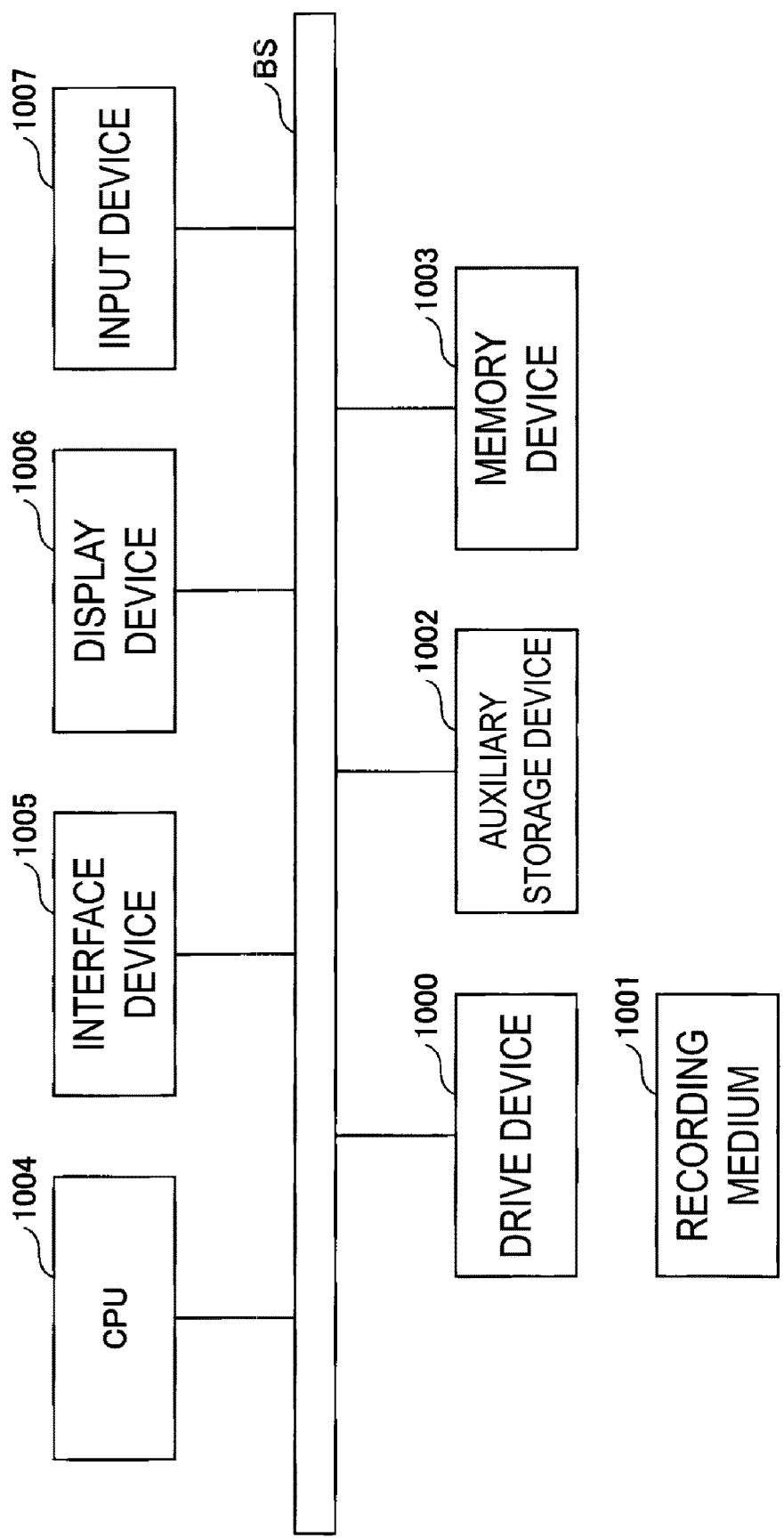
FIG. 2 is a diagram illustrating an example of a hardware configuration of an apparatus.

FIG. 2 illustrates an example of a hardware configuration of the apparatus (computer) according to the input display system. The apparatus illustrated in FIG. 2 corresponds to the hardware configuration of the input display system itself when the input display system is the client type. When the input display system is the client-server type, the apparatus illustrated in FIG. 2 corresponds to the hardware configuration of each of the display control unit 100 and the operation display unit 200.

The computer in FIG. 2 includes a drive device 1000, an auxiliary storage device 1002, a memory device 1003, a CPU 1004, an interface device 1005, a display device 1006, an input device 1007, and the like which are connected to each other through a bus B.

A program for implementing processing in the computer is provided by, for example, a recording medium 1001 such as a CD-ROM or a memory card. When the recording medium 1001 that stores a program is set in the drive device 1000, the program is installed in the auxiliary storage device 1002 from the recording medium 1001 via the drive device 1000. Here, the program may not necessarily be installed from the recording medium 1001 and may be downloaded from another computer via a network. The auxiliary storage device 1002 stores the installed program and also stores necessary files, data, and the like.

The memory device 1003 reads the program from the auxiliary storage device 1002 and stores the program in a case where an instruction to start the program is given. The CPU 1004 performs functions related to the input display system in accordance with the program stored in the memory device 1003. The interface device 1005 is used as an interface for connection to a network. The display device 1006 displays a graphical user interface (GUI) or the like according to a program. The input device 1007 is constituted by a keyboard, a mouse, buttons, a touch panel, or the like, and is used to input various operation instructions.

Examples of detailed configurations and operations of the input display system will be described below as Example 1 and Example 2. Examples 1 and 2 can be implemented in combination.

Embodiment 1

System Configuration

Figure 3:
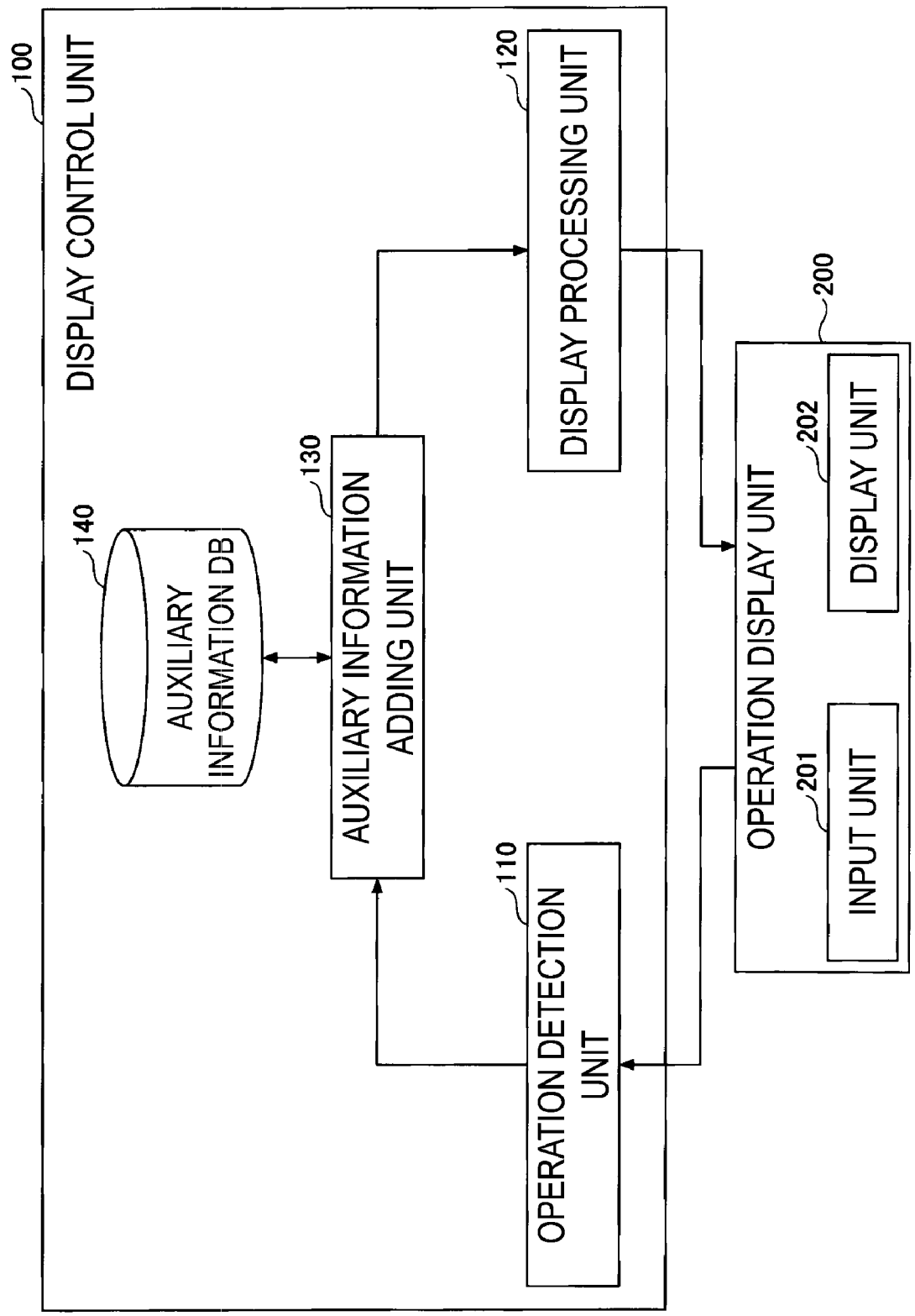
FIG. 3 is a diagram illustrating a detailed configuration of an input display system according to Example 1.

First, Example 1 will be described. FIG. 3 illustrates the input display system according to Example 1, and particularly illustrates an example of an internal configuration of the display control unit 100.

As illustrated in FIG. 3, in Example 1, a display control unit 100 includes an operation detection unit 110 (which may be referred to as a detection unit 110), a display processing unit 120, an auxiliary information adding unit 130, and an auxiliary information DB (database) 140. The outline of functions of the units is as follows.

The operation detection unit 110 detects operations performed on the input unit 201 by an operator. The display processing unit 120 performs processing of causing a screen having one or more fields to be displayed on the display unit 202. The screen switches to the next screen when the input to one or more predetermined fields is ended. Such switching control is also performed by the display processing unit 120. Switching to the next screen when the input into one or more predetermined fields is ended is an example. After the end of the input into the field, the screen may not be switched by simply performing information transmission.

Processing of causing the screen to be displayed on the display unit 202, which is performed by the display processing unit 120, is, for example, transmission of information of the screen to be displayed, and a command to instruct how the information is displayed (such as a display position of the field), to the display unit 202. For convenience, "causing the screen to be displayed on the display unit 202" may be rephrased as "displaying the screen on the display unit 202." This is similarly applied to Example 2.

When the input display system is the client-server type, the display processing unit 120 causes the above screen to be displayed on the display unit 202 as a webpage, for example.

The auxiliary information adding unit 130 displays the auxiliary information on the screen (screen including one or more fields) displayed by the display unit 202, through the display processing unit 120. More specifically, the auxiliary information adding unit 130 transmits, to the display processing unit 120, the auxiliary information (navigation, annotation, and the like described below) to be displayed on the screen displayed by the display unit 202, and information indicating a display method (position and the like) of the auxiliary information. The display processing unit 120 displays the auxiliary information on the screen displayed by the display unit 202. For convenience, the above description may be expressed as that the auxiliary information adding unit 130 displays the auxiliary information on the screen.

A plurality of pieces of information (text and the like) displayed as the annotation are stored in the auxiliary information DB 140. The auxiliary information DB 140 may store the order of fields into which information is to be input, and the like.

Operation Example

In Example 1, the auxiliary information adding unit 130 displays either or both of the navigation and the annotation on the screen which has one or more fields and is displayed by the display unit 202.

The navigation in the present embodiment refers to information for causing the operator to recognize a field into which information is to be inputted next. The annotation in the present embodiment refers to information presented to the operator in order to support determination of the content to be inputted into the field, and refers to information as a guide regarding the content of information to be inputted. In the present embodiment, the navigation just indicates which field the input is to be performed, and does not include other information.

In Example 1, when the screen having one or more fields is displayed on the display unit 202, and the operation detection unit 110 detects the field activated by the operator, the auxiliary information adding unit 130 simultaneously displays, on the screen, the navigation indicating a field into which information is to be input next.

By displaying the navigation at such a timing, the operator does not worry about which field an input is to be performed next after the input into the field is completed. Thus, it is possible to perform an input quickly, and the amount of processing of the operator per unit time is increased.

More specifically, when it is detected that a field (referred to a field A here) has been activated, the auxiliary information adding unit 130 displays navigation indicating a field into which information is to be input next to the field A. The auxiliary information adding unit displays the annotation related to the field A, hides display the annotation related to a field into which an input has been performed immediately before the field A, and then hide further the navigation indicating the field A.

In Example 1, the display position of the navigation on the screen is, for example, on the left of the left end of the field into which an input is to be performed next. In the case of a screen configuration in which an input of horizontal writing is mainly set, the input proceeds from the left to the right. Thus, the line of sight gathers on the left, and thus the navigation is displayed to the left of the input field.

However, in the case of a page arrangement (configuration) in which information is provided too much on the left side, for example, the field name and the field are close to each other, and, if the navigation is displayed, the field name is hidden or the input field is hidden, the navigation may be displayed on the left end of the field. In short, the design may be appropriately changed so that the navigation is displayed in the vicinity of a start point in a direction in which the input in which the line of sight is likely to gather proceeds with the language used for the UI, or the navigation may be displayed at a position where the line of sight is likely to gather and the display of an object such as the field or the field name is not hindered.

The display position of the annotation is, for example, any position in a region from above the upper end to the right of the right end of the activated field. The display position of the navigation and the display position of the annotation are not limited to the above positions.

When the screen is taken as an xy plane (the horizontal direction is set to an x-axis and the vertical direction is set to a y-axis), the left side is the side in which the value in the x-axis decreases.

In Example 1, a state in which a field is "activated" is a state in which an input into the field is possible. That is, when the operation detection unit 110 detects that an operation for allowing an input into the field has been performed, the operation detection unit determines that the field has been activated. The "state where an input is possible" refers to a state where the operator can perform an input into only a desired field among multiple fields.

As an example, when a portion in the field is clicked with a mouse, the field turns into the state where the input is possible. For example, the field turns into the state where the input is possible, by moving a cursor into the field with a keyboard and pressing the enter. For example, when a mouse pointer is placed in a square frame representing a check box, the check box turns into the state where the input is possible. For example, when the mouse pointer is placed in a circle representing a radio button, the radio button turns into the state where the input is possible.

An operation example will be described using a specific example of display screens (screens displayed by the display unit 202) illustrated in FIGS. 4 to 8. In FIGS. 4 to 8, when there is an explanation enclosed in parentheses such as "(activated field)" in the field, the explanation is not a text displayed on the screen but a text for explanation.

FIG. 4 illustrates a screen example in which a field having an item name of ABC (referred to as a field ABC below, and this is similarly applied to other fields), a field DEF, and a field GHI are displayed. In the example of FIGS. 4 and 5 to 8, it is assumed that the order of an input of the field ABC→the field GHI→the field DEF is defined in advance. The input order of the fields may be statically set in advance or may be determined adaptively by a method described below.

When the operator causes the field to turn into the state where the input is possible, by clicking on the field ABC, the operation detection unit 110 detects that the field ABC is activated. In this case, the auxiliary information adding unit 130 displays navigation (mark "★" in the example in FIG. 4) on the left of the left end of the field GHI into which information is to be input next. With such a navigation display, the operator can immediately start an input into the field GHI after the completion of information input into the field ABC.

As illustrated in FIG. 5, the auxiliary information adding unit 130 may display the navigation on the left of the left end of the field GHI into which information is to be inputted next to the activated field ABC, and gray out the field DEF into which information is not to be input next.

Figure 6:
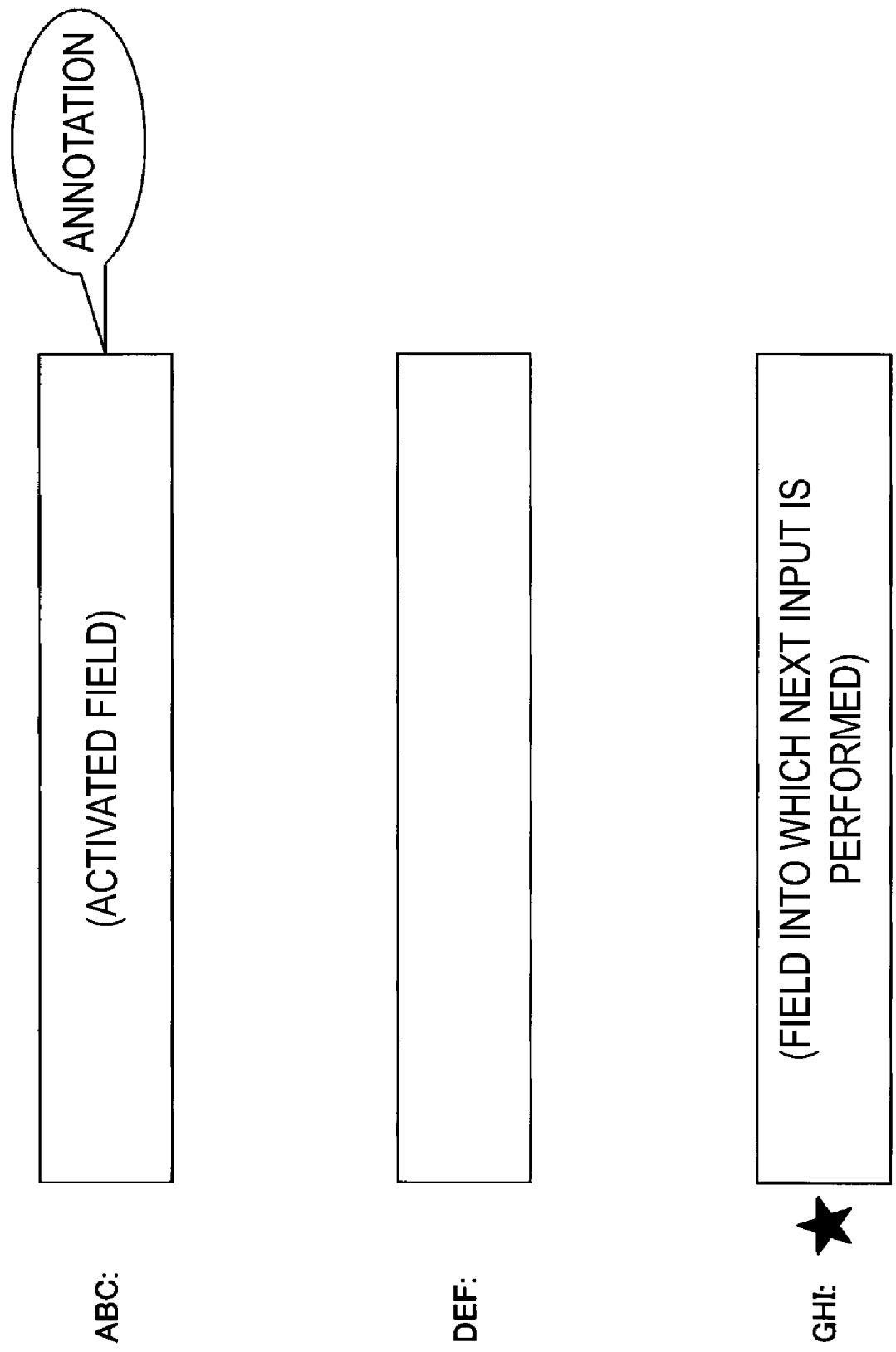
FIG. 6 is a diagram illustrating the example of the display screen of the auxiliary information.

In addition, as illustrated in FIG. 6, the auxiliary information adding unit 130 may display the navigation on the left of the left end of the field GHI into which information is to be input next to the activated field ABC, and display the annotation for the field ABC. The content of the annotation is, for example, an instruction of the number of digits of a number, an instruction of half-angle input, a request for confirmation of the input content, and the like.

For example, the auxiliary information DB 140 stores a proficiency level of each operator and the content (including no annotation) of the annotation for each field for each proficiency level. The auxiliary information adding unit 130 acquires the proficiency level of the operator who performs the current operation and the annotation corresponding to the field ABC, from the auxiliary information DB 140, and displays the acquired annotation on the right of the right end of the field ABC in the example illustrated in FIG. 6. The proficiency level may be any of a plurality of action analysis indices of the operator, which will be described in Example 2, and may be obtained by a technique other than a technique in Example 2.

The proficiency level used to select the annotation to be displayed may be obtained from an operation related to the field into which the input has been performed before the currently-activated field. The proficiency level may be obtained from the same type of field into which the input has been performed in the past, or may be obtained from all fields into which the input has been performed in the past.

The content of the annotation may be fixedly defined for each field. The annotation to be displayed may also be determined by a method described in Example 2. That is, the display control unit 100 may include both the function in Example 1 and the function in Example 2.

Figure 7:
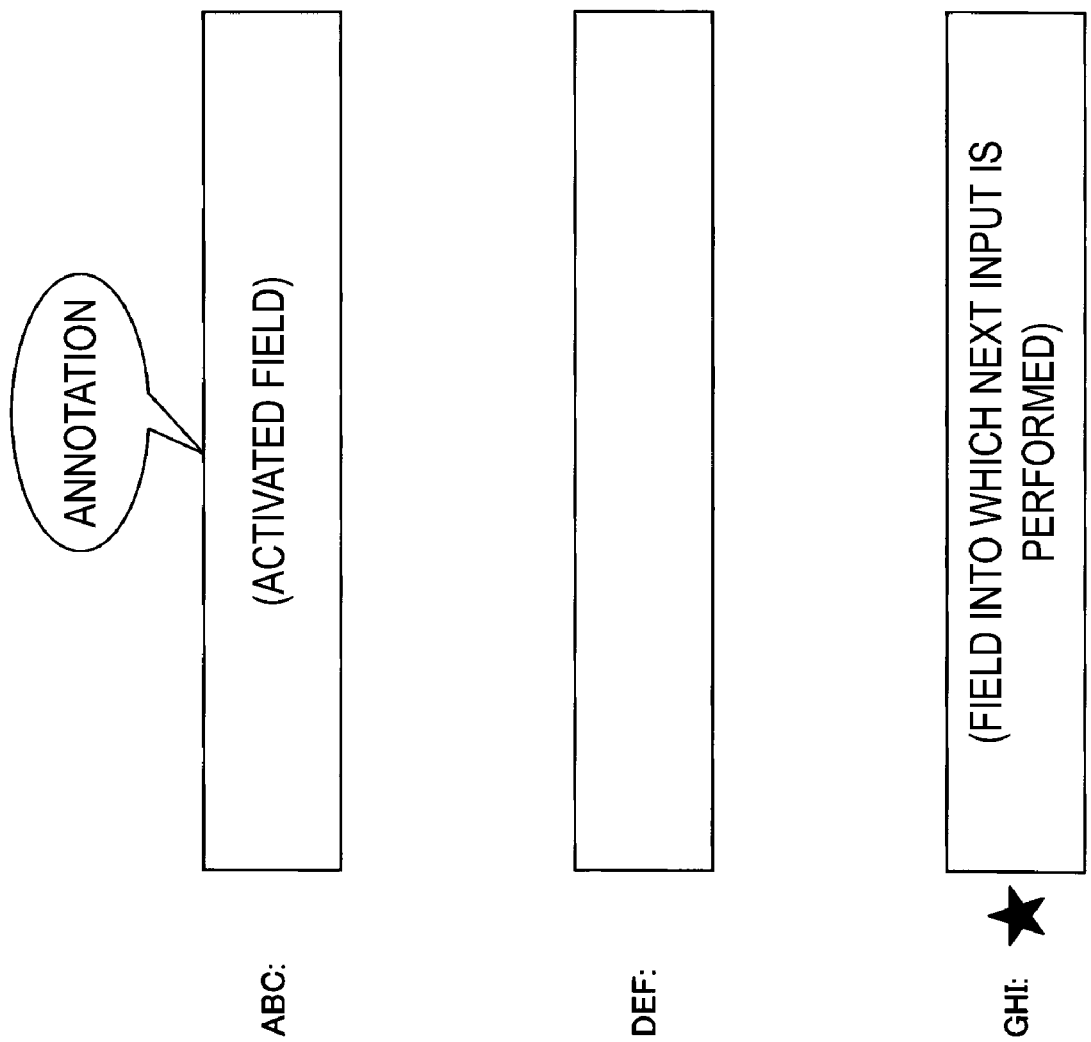
FIG. 7 is a diagram illustrating the example of the display screen of the auxiliary information.

As illustrated in FIG. 7, regarding the display position of the annotation, the annotation may be displayed above the upper end of the field ABC.

Figure 8:
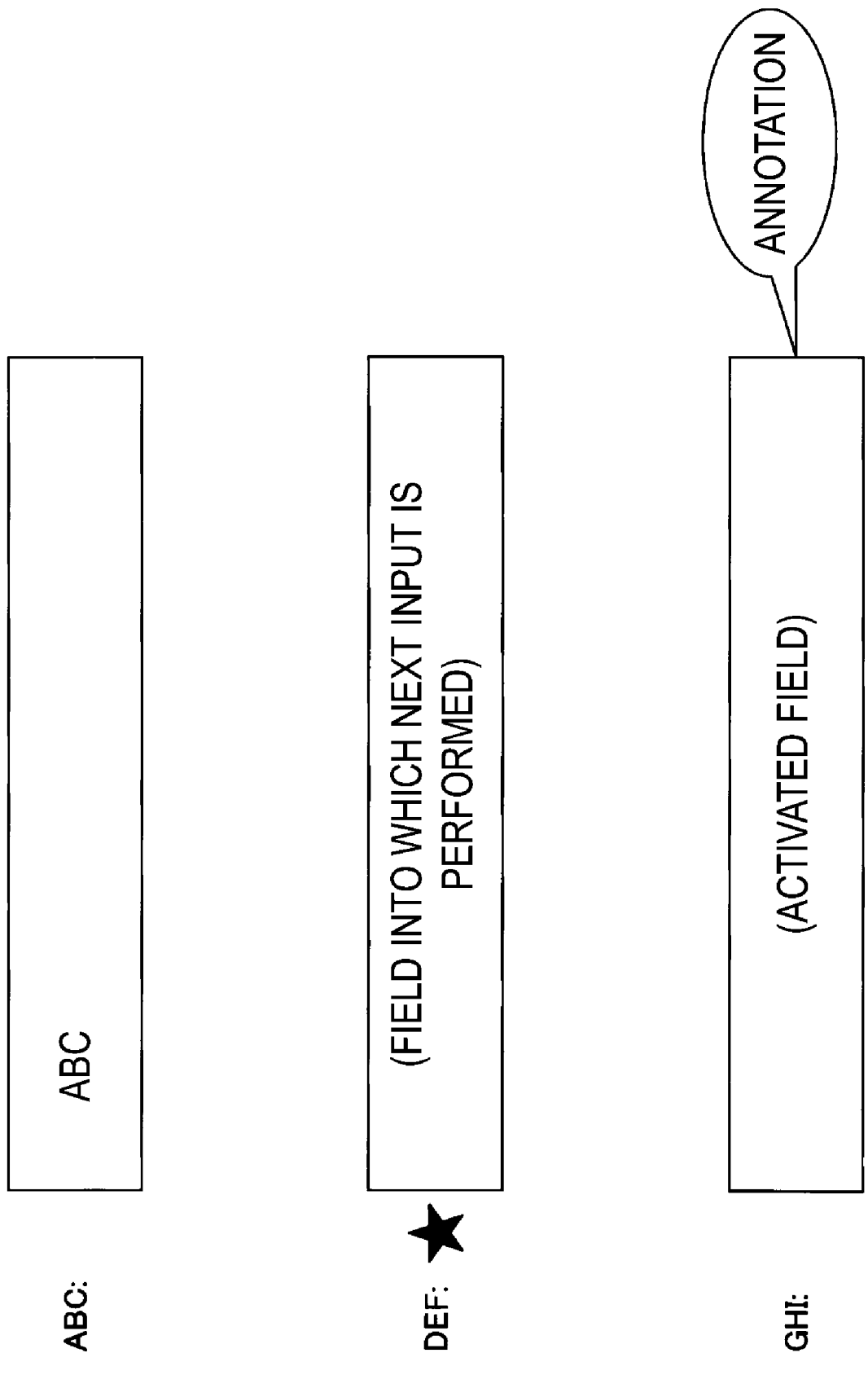
FIG. 8 is a diagram illustrating the example of the display screen of the auxiliary information.

Subsequently to FIG. 6 (or FIG. 7), as illustrated in FIG. 8, when the input into the field ABC by the operator is completed and the field GHI into which information is to be input next is activated, as illustrated in FIG. 8, the auxiliary information adding unit 130 sets the annotation for the field ABC input immediately before, to hide.

Regarding Input Order of Fields

As described above, the input order of the fields may be statically set in advance or may be determined adaptively.

A method of adaptively determining the input order is, for example, a method of using an operation log of the operator. In this case, in Example 1, the display control unit 100 includes an operation log acquisition unit 150 and an operation log DB 160, which will be described in Example 2.

The auxiliary information adding unit 130 determines, based on the operation log, a field transition order (one having the highest transition rate) for a predetermined period (Y) in which the number of operators having the proficiency level (for example, a value of a certain action analysis index), which is on the top is X, as the input order of the fields. Regardless of the proficiency level, the auxiliary information adding unit 130 may determine, based on the operation log, a transition order (the highest transition rate) for a certain period of time (Y) of all operators, as the input order of the fields.

Regarding the proficiency level of each operator, the display control unit 100 may calculate the proficiency level, and may acquire and use the proficiency level of each operator, which has been obtained in advance, from the outside.

According to Example 1, it is possible to display auxiliary information at an appropriate location at an appropriate timing on a screen for inputting information into the field. Thus, it is possible to improve the processing efficiency of the operator.

Embodiment 2

System Configuration

Figure 9:
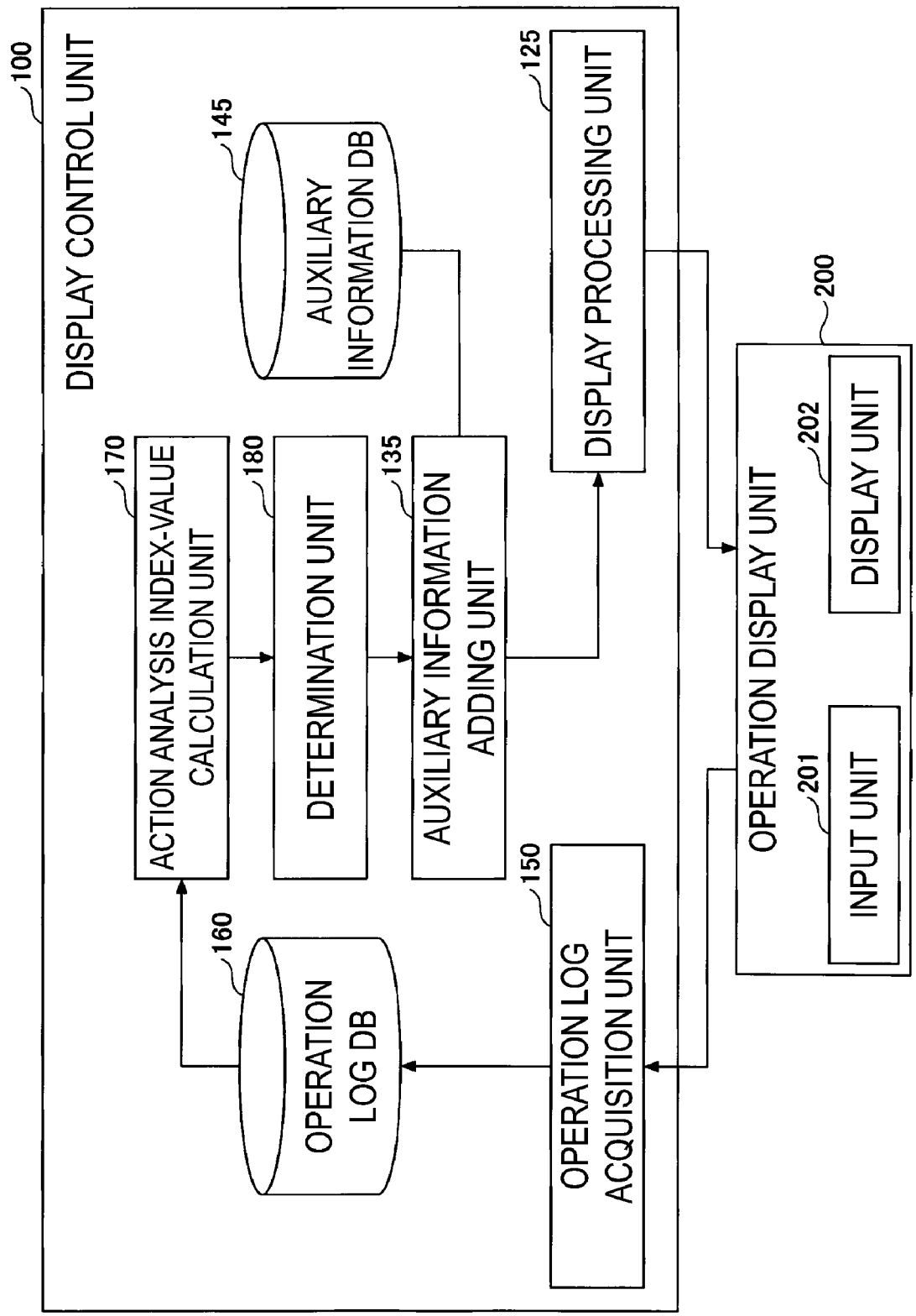
FIG. 9 is a diagram illustrating a detailed configuration of an input display system according to Example 2.

Next, Example 2 will be described. FIG. 9 illustrates an input display system according to Example 2, and particularly illustrates an example of an internal configuration of a display control unit 100.

As described above, an input display system may be either the client-server type or the client type. In an operation example described below, as an example, it is assumed that the input display system is the client-server type, and a plurality of operation display units (client apparatuses) 200 operated by a plurality of operators are connected to a display control unit (server apparatus) 100. FIG. 9 illustrates one operation display unit 200 as a representative. In addition, it is assumed that a web browser operates on the operation display unit 200 and no special software related to auxiliary information display is installed.

The present example is not limited to the client-server type, and the client type may be adopted. When the client type is adopted, in addition to various operation logs described later, a mouse trajectory obtained when the mouse is moved can be acquired as the operation log, and the mouse trajectory can be used to calculate the action analysis index value. For example, when a transition is made from a certain field to another field, and the length of the mouse trajectory is longer than a distance between the fields by a threshold value or more, a value indicating that the proficiency level is low is calculated as the action analysis index value.

As illustrated in FIG. 9, in Example 2, the display control unit 100 includes a display processing unit 125, an auxiliary information adding unit 135, an auxiliary information DB (database) 145, an operation log acquisition unit 150, an operation log DB 160, an action analysis index-value calculation unit 170, and a determination unit 180. The outline of functions of the units is as follows.

The display processing unit 125 performs processing of causing a screen having one or more fields to be displayed on the display unit 202. The screen switches to the next screen when the input to one or more predetermined fields is ended. Such switching control is also performed by the display processing unit 125. Switching to the next screen when the input into one or more predetermined fields is ended is an example. After the end of the input into the field, the screen may not be switched by simply performing information transmission.

The auxiliary information adding unit 135 displays auxiliary information on a screen (screen including one or more fields) displayed by the display unit 202. The auxiliary information in Example 2 is, for example, the annotation described in Example 1. That is, for example, as illustrated in FIG. 6, the auxiliary information adding unit 135 displays the annotation for supporting an input into a field. The auxiliary information in Example 2 is not limited to the annotation.

Information (text and the like) displayed as the auxiliary information (annotation) is stored for each field and for each action analysis index, in the auxiliary information DB 145. There may be common auxiliary information between fields and between action analysis indices.

The operation log acquisition unit 150 acquires, from the operation display unit 200, information (operation log) indicating an operation performed by the operator on the input unit 201 of the operation display unit 200. The operation log may be acquired periodically or may be acquired every operation. The operation log acquired by the operation log acquisition unit 150 is stored for each operator in the operation log DB 160. The operation log may be referred to as action information.

The action analysis index-value calculation unit 170 calculates values (referred to as action analysis index values) for a plurality of action analysis indices for each operator and each field. The action analysis index may be referred to as a "factor". The calculated action analysis index value is stored in a storage unit (memory or the like) included in the action analysis index-value calculation unit 170 for each operator, for each field, and for each action analysis index.

The determination unit 180 compares the action analysis index value to a predetermined threshold value for each action analysis index in a certain field (for example, a field activated by the operator) into which a certain operator performs an input. The determination unit 180 determines whether or not the auxiliary information corresponding to the action analysis index is a display candidate to be displayed in the field. The display control unit 100 has a function of detecting whether or not the field is activated.

The auxiliary information adding unit 135 selects one action analysis index from one or more action analysis indices as candidates for displaying the auxiliary information with respect to field. Then, the auxiliary information adding unit 135 displays the auxiliary information corresponding to the selected action analysis index, with respect to the field on the screen displayed on the display unit 202. The display positions are, for example, as illustrated in FIGS. 6 and 7.

Operation Example

Figure 10:
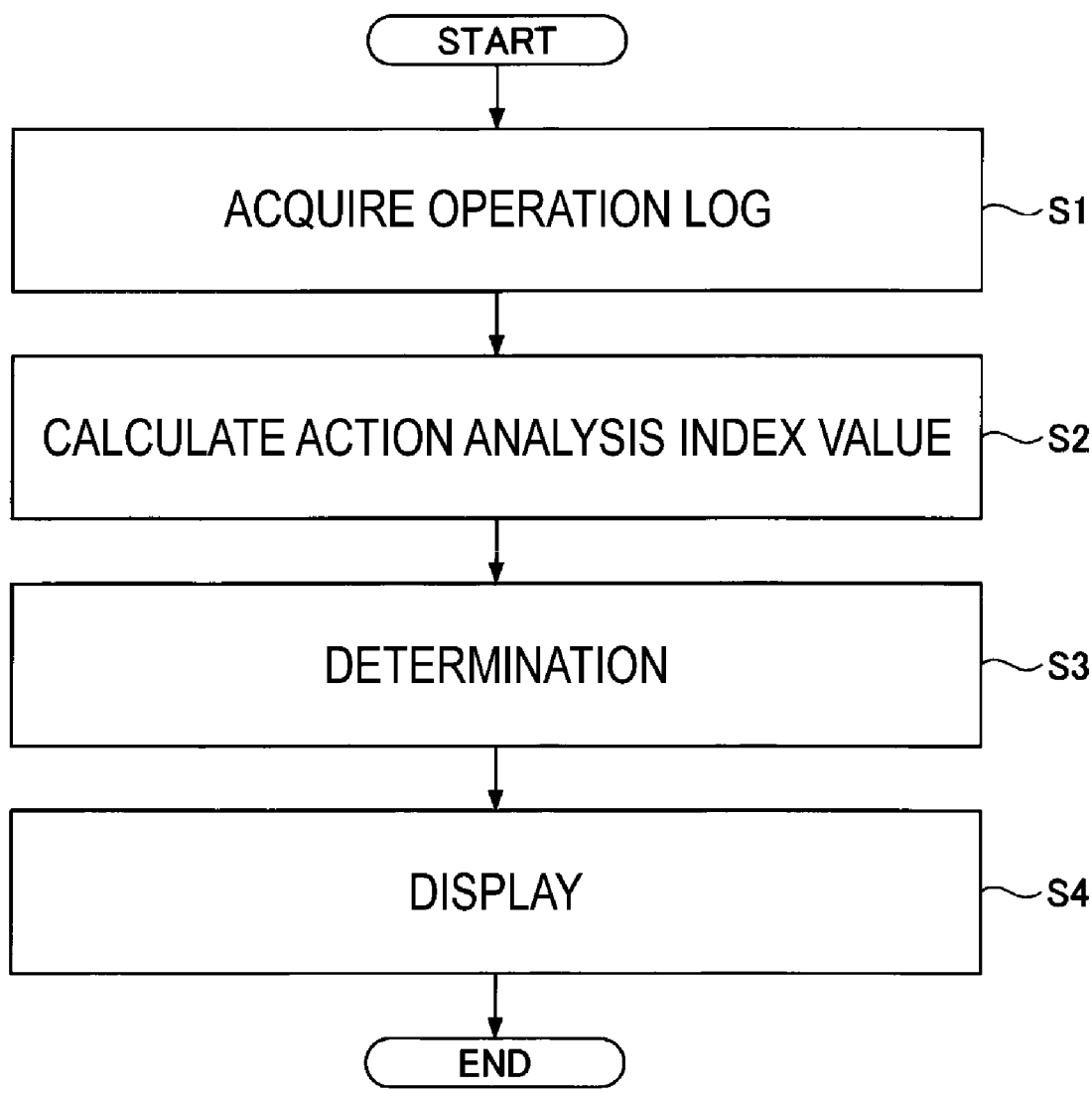
FIG. 10 is a flowchart illustrating an operation example of the input display system in Example 2.

An operation example of the input display system in Example 2 will be described below in accordance with the procedure of the flowchart of FIG. 10. An operation example focusing on a certain operator (operator who operates the operation display unit 200 in FIG. 9) will be described below.

In S1, the operation log acquisition unit 150 acquires the operation log from the operation display unit 200, and stores the acquired operation log in the operation log DB 160. The operation log is acquired periodically, for example. The acquired operation log is as follows. The log below is an example. Any log may be acquired as long as the log can be used to calculate the action analysis index value for each action analysis index described later.

The acquired operation logs include a log for the web browser and a log for the keyboard.

As a log for the web browser, there are page read information, window activation information, and operation information on each field.

The page read information includes a time stamp at the time of completion of reading, a URI, and an ID of a window in which the page is opened. The window activation information includes a time stamp when the window of the browser has been selected, a time stamp when the selection has shifted to another window, and a time stamp when the window of the browser has been closed.

The operation information on each field includes a time stamp at the time of occurrence of an event, id attribute name attribute (key value) of a target field, and a value of the target field. The occurrence of an event indicates the occurrence of an operation of an operator, which is to be acquired. The time stamp at the time of occurrence of an event includes a time stamp at the time of being activated, a time stamp at the time of inputting/deleting a character, a time stamp at the time of changing the value of a check box or a radio button, and a time stamp at the time of releasing the activation.

The log for the keyboard includes an operated time stamp, an operated key number, and a key state (key down OR up).

As described above, in the client type, in addition to a log similar to the above log, information on the trajectory obtained by moving the mouse can be acquired as a log.

In S2, the action analysis index-value calculation unit 170 refers to the operation log DB 160 to check whether the operation of each page has been completed (whether the page has moved to another page) from the page read information and the window activation information, and calculates the action analysis index value of each action analysis index for each field operated on the page during a page operation period. That is, the action analysis index-value calculation unit 170 calculates the action analysis index value for each page, for each field, and for each action analysis index.

In Example 2, the action analysis index-value calculation unit 170 calculates the respective values of five action analysis indices shown below in 1. to 5, for each field.

1. Number of Times of Being Activated

The number of times of the field being activated.

2. Number of Modifications

During the activation, the number of times of the Del key or BS key being pressed (number of times of a character being erased).

3. Input Time

The time from the time stamp when the first character has been input to the time stamp when the last character has been input, during the activation.

4. Pre-Input Time

The time from the activated time stamp to the time stamp when the first character has been input.

5. Interval Time

The time from the time stamp when the last character has been input in the previous field of the target field to the time stamp when the target field has been activated. Regarding the activation on the first field after the page transition, the time from the time stamp when the page has been read to the activated time stamp. The interval time is the time when the operator has not inputted information onto the screen.

When the same field is activated a plurality of times in a certain page, for the interval time, the pre-input time, the input time, and the number of modifications, an average value for each activation is calculated, and the calculated average value is used as the value of the corresponding action analysis index.

The value of each action analysis index may be referred to as the "proficiency level" because a difference between the skilled person and a beginner clearly occurs.

This is based on the idea that the number of processes per unit time decreases as the trouble until the operator determines which field is to be input and what content is to be input into the field decreases.

By quantifying the trouble for each factor, it is possible to estimate whether the operator is a beginner or a skilled person in terms of whether the degree of trouble is high or low, and to select the appropriate annotation based on the estimated results. The appropriate annotation here means auxiliary information related to an event that an operator may most likely suffer based on the degree of proficiency of the operator. The appropriate annotation may be paraphrased as auxiliary information having a high possibility of contributing to increase the number of processes per unit time.

The action analysis index-value calculation unit 170 calculates and retains the average value of the action analysis index values of the past N times (N is an integer of 1 or more) of the operator for each operator, for each field, and for each action analysis index. The value retained by the action analysis index-value calculation unit 170 can be used in S3.

Then, S3 will be described. S3 and S4 are operations, for example, when a field (referred to as the target field) on the screen is activated by the operator (referred to as a target operator). This operation has the premise that the auxiliary information is displayed when the field is activated. Example 2 is not limited to such premise, and the timing at which the auxiliary information is displayed with respect to a certain field is not limited to the timing of activation. For example, the auxiliary information may be displayed before activation is performed.

The determination unit 180 retains a threshold value of each of the five action analysis indices for each field, and compares the action analysis index value to the corresponding threshold value for each action analysis index, for the target field of the target operator. The action analysis index value as a comparison target may be the average value of the action analysis index values of past N times for the target field of the target operator.

The determination unit 180 determines the auxiliary information corresponding to the one or more action analysis indices in which the action analysis index is equal to or more than the threshold value, to be a display candidate. For example, when the value of the number of times of being activated and the value of the pre-input time are equal to or more than the respective threshold values, the determination unit 180 determines the auxiliary information corresponding to the number of times of being activated, and the auxiliary information corresponding to the pre-input time, as display candidates.

In S4, the auxiliary information adding unit 135 determines that the auxiliary information corresponding to the action analysis index having the highest priority among the one or more pieces of auxiliary information as the display candidates is the auxiliary information to be displayed. Then, the auxiliary information adding unit acquires the auxiliary information from the auxiliary information DB 145, and displays the auxiliary information with respect to the target field.

In Example 2, the priority of the action analysis indices is as follows. The priority of the number of times of being activated is highest and the priority order of the interval time is lowest.

1. Number of Times of Being Activated
2. Number of Modifications
3. Input Time
4. Pre-Input Time
5. Interval Time For example, when the determination unit 180 determines that the auxiliary information corresponding to the number of times of being activated and the auxiliary information corresponding to the pre-input time are display candidates, the auxiliary information adding unit 135 displays the auxiliary information corresponding to the number of times of being activated with a higher priority.

In the above example, the auxiliary information to be displayed with respect to the target field is determined when the target field is activated. Instead of such processing, S3 and S4 (processing before actual display) may be performed in advance for each operator and for each field to determine the auxiliary information to be displayed in advance. Upon actually detecting the activation on a certain field, the auxiliary information may be displayed with respect to the field.

The threshold value is calculated periodically, for example. Regarding a method of calculating the threshold value, for example, the average value for all operators is calculated for each field and for each action analysis index, and the calculated average value is set as the threshold value.

Priority of Action Analysis Index

The priority of the action analysis index described above is a priority order for the purpose of improving productivity or processing efficiency, that is, increasing the amount of processing per unit time of the operator. This is based on the knowledge that the productivity is improved by correcting an input error (including a field error), in comparison to the hesitation of what is to input.

In a case of a beginner operator, for example, the priorities of 3 to 5 may be set to be high so as to eliminate input hesitation.

Furthermore, the priority may be set adaptively. For example, the priority order may be estimated adaptively from the operation log of the operator. In this case, as the operation log used for estimation, only an operation log of an operator group satisfying the proficiency level as the target may be used.

Other Use Examples of Action Analysis Index Value

The action analysis index-value calculation unit 170 may summarize the values of the five action analysis indices into one for each operator and for each field, may further summarize values calculated for each field into one, and output the summarized value as an evaluation value representing the processing efficiency of the operator.

For example, it is assumed that there are the field A and a field B, and it is assumed that, for a certain operator, values of five action analysis indices in the field A are obtained as (X1, X2, X3, X4, X5), and values of five action analysis indices in the field B are obtained as (Y1, Y2, Y3, Y4, Y5).

In this case, for example, $\alpha 1, \alpha 2, \alpha 3, \alpha 4, \alpha 5, \beta 1, \beta 2, \beta 3, \beta 4$, and $\beta 5$ may be predetermined integers, and $(((\alpha 1 X 1 + \alpha 2 X 2 + \alpha 3 X 3 + \alpha 4 X 4 + \alpha 5 X 5)/(\alpha 1 + \alpha 2 + \alpha 3 + \alpha 4 + \alpha 5)) + ((\beta 1 Y 1 + \beta 2 Y 2 + \beta 3 Y 3 + \beta 4 Y 4 + \beta 5 Y 5)/(\beta 1 + \beta 2 + \beta 3 + \beta 4 + \beta 5)))/2$ may be output as the evaluation value of the operator. That is, the evaluation value may be calculated using a weighted average of the action analysis index values.

According to Example 1, it is possible to display auxiliary information according to the proficiency level of the operator, on the screen for inputting information into the field. Thus, it is possible to improve the processing efficiency of the operator.

Summary of Embodiment

In the present specification, at least the input display system, the auxiliary information display method, and the program described in each of the following Appendices 1 and 2 are described.

Appendix 1

Item 1

An input display system that displays auxiliary information on a screen for supporting an input action of an operator when a plurality of predetermined fields are displayed on the screen, and information according to a predetermined rule is input into each of the fields by the operator, the input display system including:

a detection unit configured to detect that a first field is activated, and an auxiliary information adding unit configured to, upon detection of the detection unit that the first field is activated, display, on the screen, auxiliary information indicating that information is to be input in a second field, in a predetermined range from the second field being a field into which information is to be input next to the first field.

Item 2
The input display system described in Item 1, in which the detection unit detects that only the first field turns into a state where information input into the first field is possible, among a plurality of fields, as the first field being activated.

Item 3
The input display system described in Item 2, in which the auxiliary information adding unit displays the auxiliary information on a left side based on the second field on the screen.

Item 4
The input display system described in Item 3, in which the auxiliary information adding unit
displays, in the first field, auxiliary information as a guide related to a content of information to be input into the first field, and
set auxiliary information as a guide related to a content of information regarding a third field into which information is input immediately before the first field, to hide.

Item 5
An auxiliary information display method performed by an input display system that displays auxiliary information on a screen for supporting an input by an operator when a plurality of predetermined fields are displayed on the screen, and information according to a predetermined rule is input into each of the fields by the operator, the auxiliary information display method including:
detecting that a first field is activated, and
upon detection through the detecting that the first field is activated, displaying, on the screen, auxiliary information indicating that information is to be input in a second field, in a predetermined range from the second field being a field into which information is to be input next to the first field.

Item 6
A program causing a computer to function as the units of the input display system described in any one of Items 1 to 4.

Appendix 2

Item 1
An input display system that displays auxiliary information on a screen when a plurality of predetermined fields are displayed on the screen, and information according to a predetermined rule is input into each of the fields by an operator, the auxiliary information being for supporting an input action of the operator, the input display system including:
an action analysis index-value calculation unit configured to calculate an action analysis index value of each of a plurality of action analysis indices having set priorities, based on action information indicating an action performed on an input unit used to input information on the screen by the operator;
a determination unit configured to determine whether or not the corresponding auxiliary information is a display candidate, by comparing the action analysis index value to a predetermined threshold value for each of the plurality of action analysis indices; and an auxiliary information adding unit configured to display on the screen only the auxiliary information corresponding to one action analysis index having a highest priority among one or more action analysis indices related to the display candidate.

Item 2
The input display system described in Item 1, in which each of the plurality of action analysis indices is an index indicating a proficiency level of the operator for inputting information into the field, and
the plurality of action analysis indices, obtained for the field, include
the number of times of the field being activated,
the number of characters erased from the field,
a time from when a first character is input into the field until a last character is input,
a time from when the field is activated until the first character is input, and
a time from when a last character has been input into the previous field until the field is activated.

Item 3
The input display system described in Item 1 or 2, in which the action information includes at least a mouse trajectory.

Item 4
The input display system described in Item 3, in which when a client apparatus includes a display unit for displaying the screen, and a server apparatus includes the action analysis index-value calculation unit and the determination unit,
the action analysis index-value calculation unit calculates an action analysis index value using a time for which the operator does not input the information onto the screen, instead of the mouse trajectory.

Item 5
The input display system described in any one of Items 1 to 4, in which
the action analysis index-value calculation unit summarizes a plurality of action analysis index values of the operator into one and outputs the value summarized into the one, as an evaluation value indicating processing efficiency of the operator.

Item 6
The input display system described in any one of Items 1 to 5, in which the action analysis index-value calculation unit calculates an action analysis index value for each of the plurality of action analysis indices for each field, and
the auxiliary information adding unit determines auxiliary information to be displayed for each field, and displays auxiliary information to be displayed with respect to the activated field.

Item 7
An auxiliary information display method performed by an input display system that displays auxiliary information on a screen when a plurality of predetermined fields are displayed on the screen, and information according to a predetermined rule is input into each of the fields by an operator, the auxiliary information being for supporting an input action of the operator, the auxiliary information display method including:
calculating an action analysis index value of each of a plurality of action analysis indices having set priorities, based on action information indicating an action performed on an input unit used to input information on the screen by the operator;
determining whether or not the corresponding auxiliary information is a display candidate, by comparing the action analysis index value to a predetermined threshold value for each of the plurality of action analysis indices; and
displaying on the screen only the auxiliary information corresponding to one action analysis index having a highest priority among one or more action analysis indices related to the display candidate.

Item 8
A program causing a computer to function as the units of the input display system described in any one of Items 1 to 6.

Although the present embodiment has been described above, the present invention is not limited to such a specific embodiment, and various modifications and changes can be made within the scope of the gist of the present invention described in the claims.

REFERENCE SIGNS LIST

100 Display control unit
110 Operation detection unit
120 Display processing unit
125 Display processing unit
135 Auxiliary information adding unit
130 Auxiliary information adding unit
140 Auxiliary information DB
145 Auxiliary information DB
150 Operation log acquisition unit
160 Operation log DB
170 Action analysis index-value calculation unit
180 Determination unit
200 Operation display unit
201 Input unit
202 Display unit
1000 Drive device
1001 Recording medium
1002 Auxiliary storage device
1003 Memory device
1004 CPU
1005 Interface device
1006 Display device
1007 Input device

The invention claimed is:

1. An input display system that displays auxiliary information on a screen when a plurality of predetermined fields are displayed on the screen, and information according to a predetermined rule is input into each of the fields by an operator, the auxiliary information being for supporting an input action of the operator, the input display system comprising:
a memory; and
a processor configured to:
calculate an action analysis index value of each of a plurality of action analysis indices having set priorities, based on action information indicating an action performed on an input device used to input information on the screen by the operator;
determine whether or not the corresponding auxiliary information is a display candidate, by comparing the action analysis index value to a predetermined threshold value for each of the plurality of action analysis indices; and
display on the screen only the auxiliary information corresponding to one action analysis index having a highest priority among one or more action analysis indices related to the display candidate.

2. The input display system according to claim 1, wherein each of the plurality of action analysis indices is an index indicating a proficiency level of the operator for inputting information into the field, and
the plurality of action analysis indices, obtained for the field, include
the number of times of the field being activated,
the number of characters erased from the field,
a time from when a first character is input into the field until a last character is input,
a time from when the field is activated until the first character is input, and
a time from when a last character has been input into a previous field until the field is activated.

3. The input display system according to claim 1, wherein the action information includes at least a mouse trajectory.

4. The input display system according to claim 3, wherein when a client apparatus includes a display device for displaying the screen, and a server apparatus includes the memory and the processor,
the processor calculates an action analysis index value using a time for which the operator does not input the information onto the screen, instead of the mouse trajectory.

5. The input display system according to claim 1, wherein the processor summarizes a plurality of action analysis index values of the operator into one and outputs the value summarized into the one, as an evaluation value indicating processing efficiency of the operator.

6. The input display system according to claim 1, wherein the processor calculates an action analysis index value for each of the plurality of action analysis indices for each field, and
determines auxiliary information to be displayed for each field, and displays the auxiliary information to be displayed so as to be associable with an activated field.

7. An auxiliary information display method performed by an input display system that displays auxiliary information on a screen when a plurality of predetermined fields are displayed on the screen, and information according to a predetermined rule is input into each of the fields by an operator, the auxiliary information being for supporting an input action of the operator, the auxiliary information display method comprising:
calculating an action analysis index value of each of a plurality of action analysis indices having set priorities, based on action information indicating an action performed on an input device used to input information on the screen by the operator;
determining whether or not the corresponding auxiliary information is a display candidate, by comparing the action analysis index value to a predetermined threshold value for each of the plurality of action analysis indices; and
displaying on the screen only the auxiliary information corresponding to one action analysis index having a highest priority among one or more action analysis indices related to the display candidate.

8. A non-transitory computer-readable recording medium having a program causing a computer to execute the auxiliary information display method of claim 7.

* * * * *